United States Patent
Van Vleet

Patent Number: 5,868,415
Date of Patent: Feb. 9, 1999

[54] CUSHION COUPLER

[76] Inventor: Robert D. Van Vleet, 405 12th St., Sidney, Nebr. 69162

[21] Appl. No.: 861,991

[22] Filed: May 22, 1997

[51] Int. Cl.⁶ ............................................. B60D 1/30
[52] U.S. Cl. ..................... 280/483; 280/484; 280/485; 280/511
[58] Field of Search .................... 280/511, 512, 280/513, 483, 506, 441.2, 484, 485

[56] References Cited

U.S. PATENT DOCUMENTS

| | | | |
|---|---|---|---|
| 2,127,912 | 11/1938 | Graham et al. | 280/506 |
| 3,708,183 | 1/1973 | Jones | 280/483 |
| 3,904,226 | 9/1975 | Smalley | 280/486 |
| 4,148,498 | 4/1979 | Taylor, Jr. | 280/482 |
| 4,215,876 | 8/1980 | Jacks | 280/483 |
| 4,351,542 | 9/1982 | Lovell et al. | 280/489 |
| 4,746,138 | 5/1988 | James | 280/487 |
| 4,773,668 | 9/1988 | Muonro | 280/485 |
| 4,817,978 | 4/1989 | James | 280/487 |
| 4,978,133 | 12/1990 | Thorne et al. | 280/484 |
| 5,683,094 | 11/1997 | Gullickson | 280/485 |

*Primary Examiner*—Anne Marie Boehler
*Assistant Examiner*—Michael Cuff
*Attorney, Agent, or Firm*—Greer, Burns & Crain, Ltd.

[57] ABSTRACT

A coupling device for attaching a towed vehicle, such as a trailer, to a towing vehicle, such as a truck, where the coupling device includes a securing assembly for removably securing the coupling device to the towing vehicle, a generally longitudinally extending inner assembly rigidly affixed to the securing assembly, and a generally longitudinally extending outer assembly. The outer assembly also includes an upper portion and a lower portion, with the upper portion being adapted to be rigidly affixed to the towed vehicle. The outer assembly has an inner diameter that is larger than an outer diameter of the inner assembly so that the outer assembly can be coaxially mounted over the inner assembly. The coupling assembly further includes a connecting member for connecting the inner assembly with the outer assembly, and a cushioning member that is positioned between the outer assembly and the inner assembly. The cushioning member is configured and arranged to primarily dampen lateral forces transferred between the inner assembly and the outer assembly. Optionally, the coupling device may also include a secondary cushioning assembly that is configured and arranged to primarily dampen axial forces transferred between the inner assembly and the outer assembly. As an additional option, the coupling device may also include a way of locking the securing assembly in a closed position so that unauthorized removal of the trailer from the truck can be prevented.

27 Claims, 4 Drawing Sheets

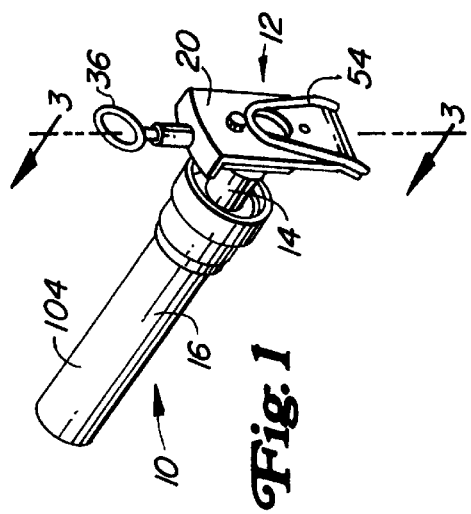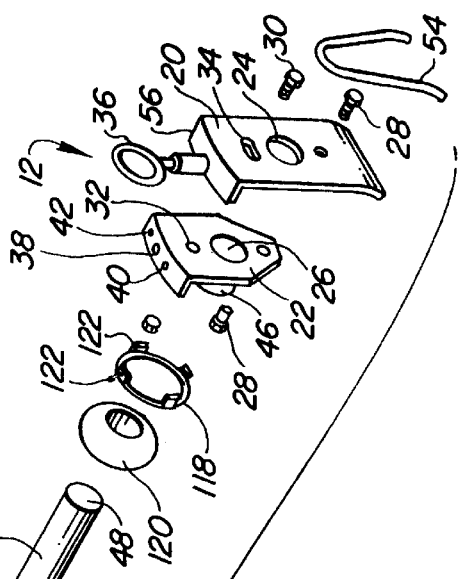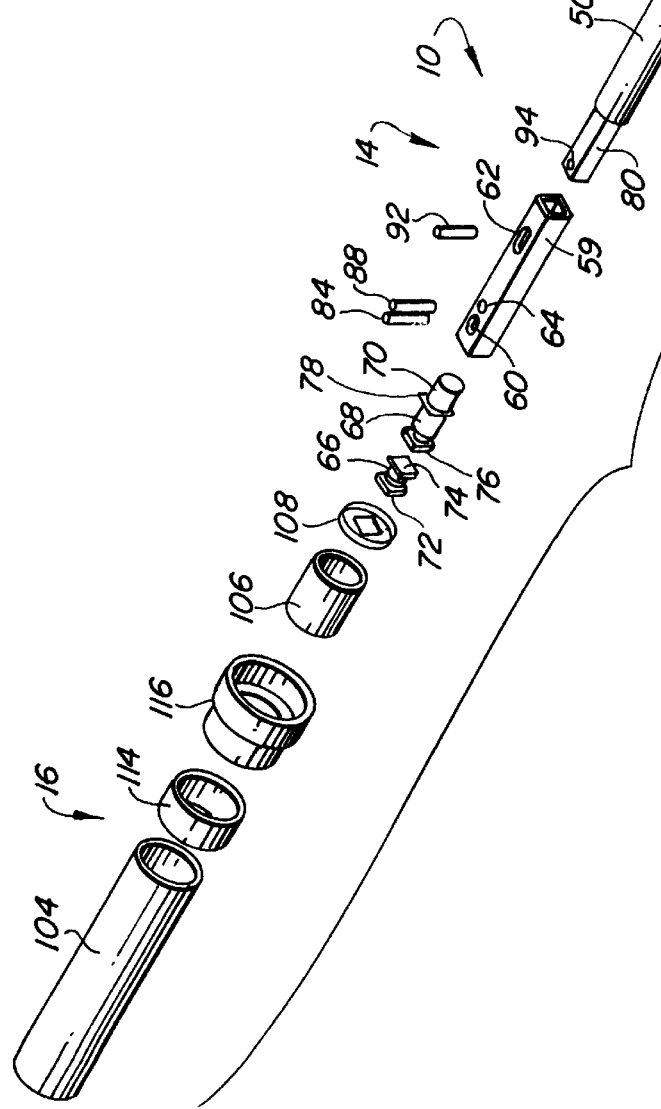

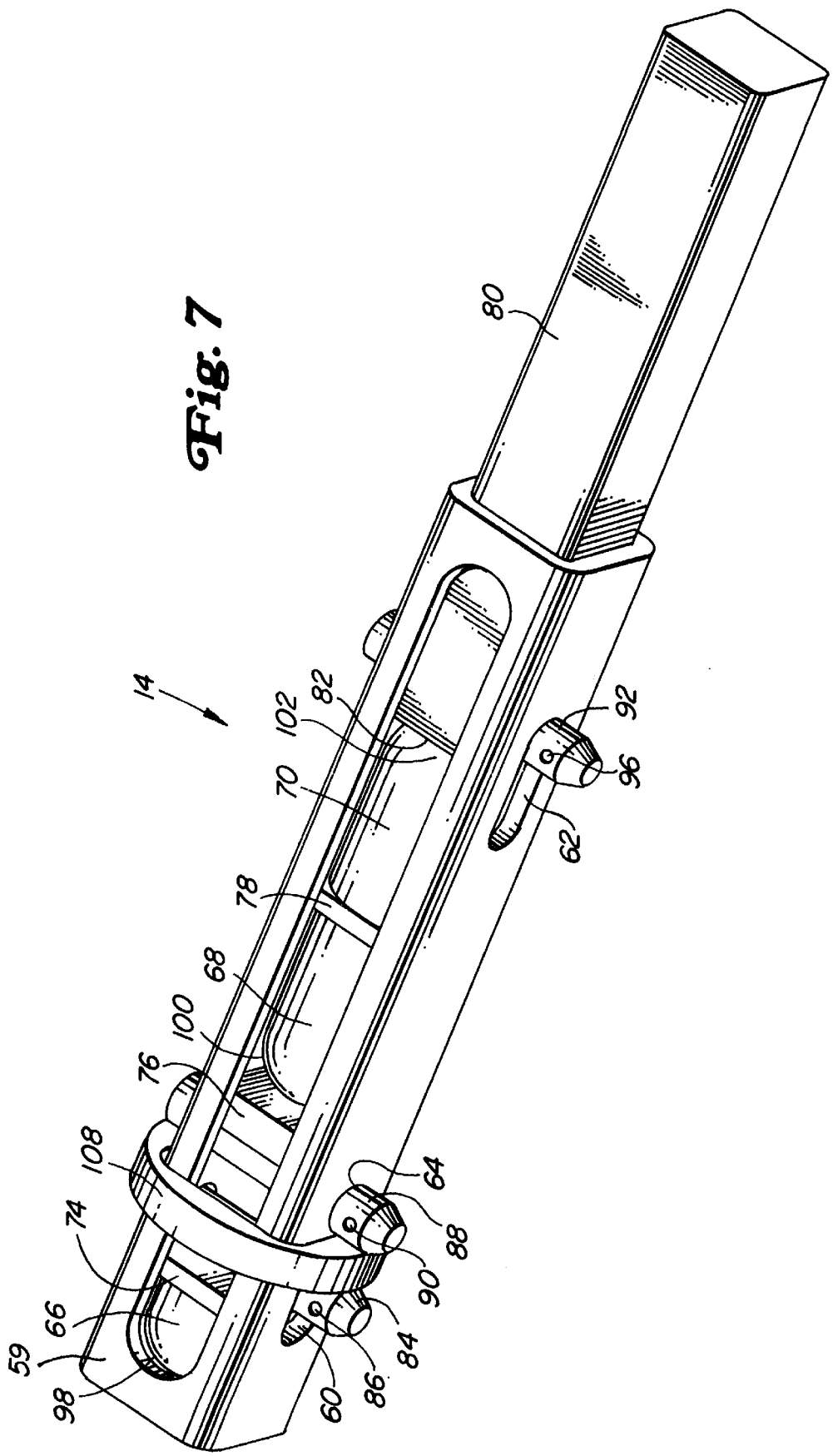

CUSHION COUPLER

BACKGROUND

The present invention relates generally to a coupling device for connecting a towed vehicle, such as a trailer, with a towing vehicle, such as a truck. More particularly, the present invention relates to a coupling device that includes at least one cushion for dampening shocks from the lateral direction, and preferably includes a second cushioning assembly for dampening shocks from the axial direction.

Various types of coupling devices for connecting a towing vehicle with a towed vehicle are currently available. One popular way of connecting the towed vehicle to the towing vehicle utilizes two separate components—a ball and a socket—where the ball is affixed to the towing vehicle and the socket, within which the ball is to be seated, is affixed to the towed vehicle.

One specific type of ball and socket coupling device available for coupling heavyweight trailers to trucks is commonly referred to as a "gooseneck" coupler. The socket portion of the gooseneck coupler generally includes a long, vertically extending shaft (the "gooseneck") of several feet in length. This shaft is rigidly attached to the trailer so that it extends vertically downwardly from the trailer. The ball portion of the coupler is normally rigidly affixed to the rear portion of the truck, either directly over the rear axle or somewhat in front of the rear axle. With the ball portion positioned in this manner, a better weight distribution of the trailer is achieved because the weight of the trailer is not creating a downward force on the unsupported rearmost portion of the truck.

Gooseneck couplers are commonly used with larger trailers that include an overhang portion at the front end thereof. This overhang portion enables the truck/trailer combination to make relatively sharp turns without having the front of the trailer contact the back of the truck because the frontmost portion of the trailer is actually positioned over the top of the rearmost portion of the truck. In this manner, the trailer is free to pivot with respect to the truck through a relatively wide angle, without the loss of a significant amount of storage space in the trailer.

While gooseneck couplings are commonly used with the overhang trailers just described, they may also be used with trailers without an overhang portion, which instead include an A-frame extending horizontally from the front end of the trailer. The "A" shape of the A-frame may be seen when the trailer is viewed from above. Similar to the overhang, the A-frame also permits a relatively wide turning radius without the front of the trailer contacting the rear of the truck because the A-frame serves to provide sufficient distance between the front of the trailer and the back of the truck. Combinations of the A-frame setup and an overhang trailer are also available.

One problem with some of the currently available gooseneck coupling devices is caused by a lack of shock absorption, or at least insufficient shock absorption. During normal operation, shocks may be transferred between the trailer and the towing vehicle. These shocks may arise from a variety of sources such as uneven road surfaces, potholes, high winds acting upon the trailer, forces created by altering the velocity of the vehicle (i.e., starting or stopping the vehicle's motion), or the torsional forces that are created when the vehicle/trailer combination makes a turn. Further, as these shocks are created from a variety of sources, they also act in a variety of different directions. For example, the bulk of the force of a torsional shock occurs from the lateral direction, while the bulk of the force from a pothole occurs in the vertical direction, or along the axis of the vertically extending shaft.

No matter which direction the force of the shock is directed, similar consequences may result. Undampened shocks transferred within the coupling device can serve to weaken the materials of the coupling device, which may result in failure of the coupling device over time. More severe shocks can also instantaneously break the coupling device, if these severe shocks are not properly dampened. Besides requiring replacement, a broken coupling device can also lead to a dangerous traffic accident if the break occurs while traveling at high speeds, which is most often the condition under which a break is likely to occur.

An additional problem with the currently available coupling devices relates to the security of the coupling. After the trailer and the towing vehicle are connected to one another, they should be locked together. If no lock is available for the coupling, vandals or thieves may simply uncouple the trailer from the towing vehicle when the towing vehicle and trailer are parked. At minimum, this unauthorized uncoupling results in wasted time because the trailer and towing vehicle will have to be re-coupled. At worst, a valuable trailer and expensive cargo may be lost if the entire trailer, including the cargo therein, is stolen by being removed from the towed vehicle during an extended period of being parked.

Accordingly, in response to the problems discussed above, a primary object of the present invention is to provide an improved coupling device for coupling a towing vehicle with a towed vehicle, where the present coupling device includes adequate shock dampening.

Another object of the present invention is to supply an improved coupling device that includes shock dampening for laterally directed shocks.

A further object of the present invention is to provide an improved coupling device that includes sufficient shock dampening for axially directed shocks.

An additional object of the present invention is to provide an improved gooseneck coupling device with adequate shock dampening to avoid premature failure of the coupling.

Yet another object of the present invention is to supply an improved coupling that includes an effective, low-cost way of locking a trailer with a towing vehicle in a coupled state.

These and other objects of the present invention will be apparent from the following detailed description of the invention, while referring to the attached drawings in which:

FIG. 1 is a perspective view of the present coupling device in an assembled state, shown positioned on its side to clearly show the bottom portion thereof;

FIG. 2 is an exploded perspective view of the present coupling device;

FIG. 7 is a perspective view of the upper portion of the inner assembly, shown with the outer assembly partially cut away to render a portion of the inner assembly visible.

Figure 3:
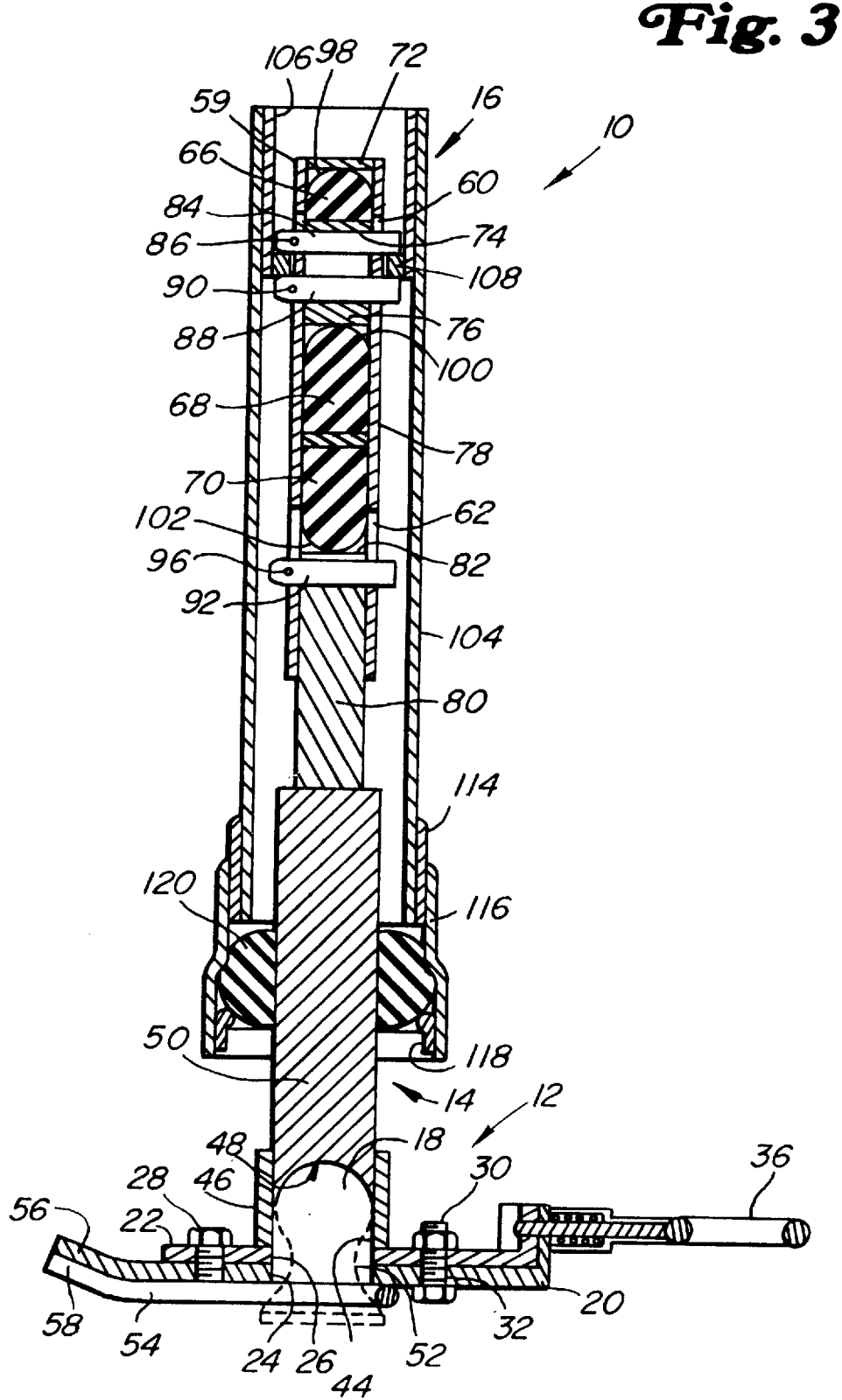
FIG. 3 is a cross-sectional view of the present coupling device, shown in an upright, operational position, with the cross-section taken along lines 3—3 shown in FIG. 1.

The above-listed objects are met or exceeded by the present apparatus that provides an improved coupling device for connecting a towed vehicle (such as a trailer) with a towing vehicle (such as a truck). Generally, the present invention includes a coupling device with two primary components, where one component is rigidly affixed to a towed vehicle and the other component includes a socket portion that may be removably connected to a ball portion that is rigidly affixed to the towing vehicle. Located between the two components is a cushioning member that is capable of dampening shocks received from the lateral direction. Preferably, the present invention also includes a secondary cushioning arrangement that is capable of dampening shocks received from the axial direction.

More specifically, the present invention is a coupling device for attaching a towed vehicle to a towing vehicle, where the coupling device includes three main assemblies—a securing assembly for removably securing the coupling device to the towing vehicle; a generally longitudinally extending inner assembly; and a generally longitudinally extending outer assembly. The inner assembly is rigidly affixed to the securing assembly, and the outer assembly includes an upper portion that is adapted to be rigidly affixed to the towed vehicle. The outer assembly further includes an inner diameter that is larger than an outer diameter of the inner assembly so that the outer assembly can be coaxially mounted over the inner assembly. The present coupling device also includes a connecting member for connecting the inner assembly with the outer assembly and a cushioning member positioned between the outer assembly and the inner assembly. The cushioning member is configured and arranged to primarily dampen lateral forces transferred between the inner assembly and the outer assembly.

The preferred embodiment of the present coupling device may also optionally include two additional features—a second cushioning assembly and a locking mechanism. The second cushioning assembly is configured and arranged to primarily dampen axial forces transferred between the inner and outer assemblies, and may include several cushion members separated by several spacers. Briefly, the locking mechanism of the present invention enables one to lock the towed vehicle to the towing vehicle with an ordinary padlock, without the need for other, more expensive, specialized locking equipment.

DETAILED DESCRIPTION OF THE PREFERRED EMBODIMENTS

Referring now to the drawings, the preferred embodiment of the present coupling device is shown in FIGS. 1–7, with FIG. 1 showing the preferred embodiment of the present coupling device, indicated generally at 10, in a fully assembled state. The coupling device 10 is shown positioned on its side so that a better view of its bottom portion, which includes a securing assembly 12, may be seen. However, in ordinary operation, the coupling device 10 will be positioned vertically, with the securing assembly 12 located on the bottom of the coupling device 10. A portion of an inner assembly 14 and an outer assembly 16 are also shown in FIG. 1.

Figure 4:
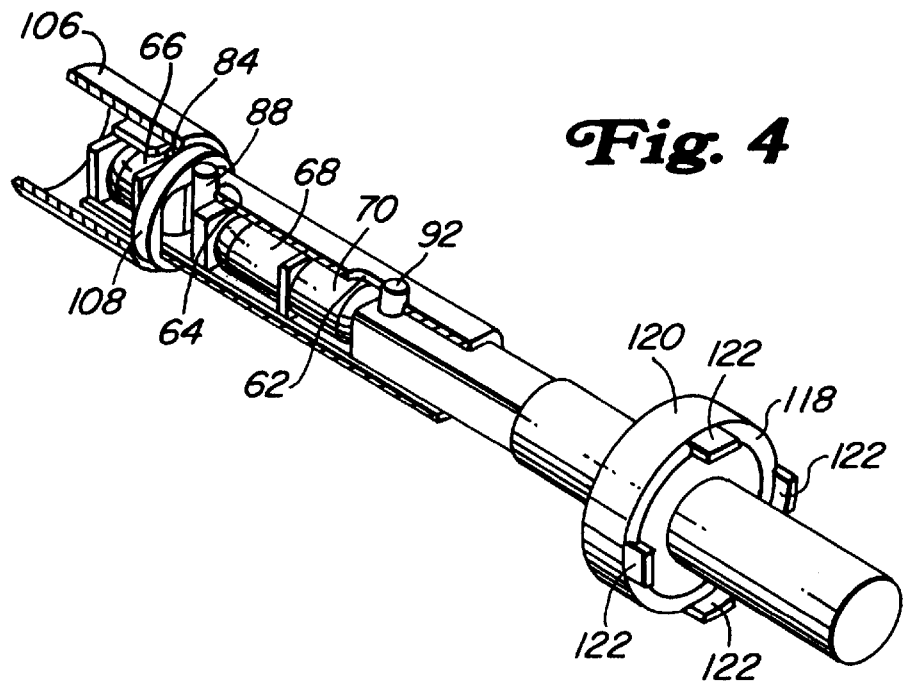
FIG. 4 is a partially cutaway perspective view of the present coupling device, with the outer assembly removed to more clearly show the components of the inner assembly.

Referring also to FIGS. 2–4, the primary features of the preferred embodiment, including the securing assembly 12, the inner assembly 14, and the outer assembly 16, will be described. The securing assembly 12 is configured to secure the coupling device 10 to a ball hitch connector or ball 18 (shown in hidden lines in FIG. 3), which is rigidly affixed to a towing vehicle, such as a truck. For simplicity of description, the towing vehicle will be referred to as a truck and the towed vehicle will be referred to as a trailer; however, it is contemplated that other combinations of towed and towing vehicles may be used with the present invention.

Returning to the combination of the securing assembly 12 and the ball 18, it is contemplated that other types of securing structures besides the common ball-and-socket type arrangement shown and described may also be utilized with the present coupling device. These other types of securing assemblies would be known to one of ordinary skill in the art. However, for the sake of simplicity, only the ball-and-socket arrangement will be shown and described.

The securing assembly 12 includes a bottom plate 20 and a top plate 22. Within both the bottom plate 20 and the top plate 22 are holes 24 and 26, respectively, for receiving the ball 18. The diameters of the holes 24 and 26 are slightly larger than the largest diameter of the ball 18 to permit the ball to slide into both of the holes 24 and 26. For example, where the ball 18 has one of the standard diameters of 2 5/16 inches, the holes 24 and 26 each have diameters of approximately 2 7/16 inches.

The top plate 22 is pivotally connected to the bottom plate 20 via a pivot pin 28. The pivot pin 28 is rigidly affixed to the bottom plate 20, such as by welding, and moveably seated in a hole in the top plate 22. Thus, the bottom plate 20 and the top plate 22 are permitted to pivot with respect to each other. A pin or bolt assembly 30 limits the angular range that the bottom plate 20 can pivot with respect to the top plate 22. The bolt assembly 30 is securely seated in a hole 32 in the top plate 22, and moveably seated in an elongated slot 34 in the bottom plate 20. The slot 34 allows the bolt 30 to move within a certain limited angular range, thus permitting the bottom plate 20 to pivot for this same limited angular range. As an example, the slot 34 may extend for approximately one inch, which permits the top plate 22 and the bottom plate 20 to be pivoted with respect to each other for approximately 1/4 to 3/8 of an inch.

A spring pin 36 is used to lock the top plate 22 and the bottom plate 20 in either an open position or a locked position. In the open position, the spring pin 36 is seated in a center hole 38. When the spring pin 36 is seated in the center hole 38, the hole 24 in the bottom plate 20 and the hole 26 in the top plate 22 are aligned, which permits the ball 18 to enter the holes 24 and 26 and be seated in a socket 44, which is defined by a cylindrical tube 46 and a lower surface 48 of a solid shaft 50. The bottom of the cylindrical tube 46 is welded or otherwise affixed to the top plate 22, and the top of the cylindrical tube 46 is welded or otherwise affixed to an area near the bottom of the solid shaft 50.

The lower surface 48 of the solid shaft 50 may be shaped simply as a flat surface, or it may be shaped in a concave manner to correspond to the convex shape of the top of the ball 18, as best shown in FIG. 3. A concave-shaped lower surface 48 better conforms to the shape of the outer periphery of the ball 18, which allows the stresses created when the ball 18 contacts the solid shaft 50 to be more evenly distributed over the relatively larger surface area of a concave-shaped lower surface 48, when compared to a flat-shaped surface. Thus, a concave-shaped lower surface 48 should not have the stress concentrated at a single point, as it would be with a flat-shaped lower surface, where the stress is concentrated at the single point of contact between the flat lower surface and the top of the ball 18.

To lock the ball 18 within the socket 44, the bottom plate 20 is pivoted about the pivot pin 28, and the spring pin 36 is locked in an offset hole 40. In this locked position, the hole 24 in the bottom plate is no longer concentric with the ball 18, and the ball 18 may not be withdrawn through the hole 24. The ball 18 contains a reduced diameter portion 50 (see FIG. 3) that enables the bottom plate 20 to be pivoted in this manner. When in the locked position, the ball 18 is locked within the socket 44, and should not accidentally become unseated from within the socket 44, even if either the ball 18 or the coupling device 10 are subjected to a large axial force.

As best shown in FIG. 1, the bottom plate 20 may also include features to facilitate the centering and seating of the ball 18 within the socket 44. A ball guide fork 54 may be welded or otherwise affixed to the bottom surface of the bottom plate 20. The ball guide fork 54 serves to guide the ball 18 towards the hole 24 when one is attempting to seat the ball 18 within the socket 44. Although not shown in the figures, the hole 24 in the bottom plate 20, and part of the bottom plate itself, may be shaped to define a frustoconically-shaped cavity to also help to guide the ball 18 into the socket 44. Instead of a frustoconically-shaped cavity, the hole 24 may simply include chamfered edges, which will also aid somewhat in the initial seating of the ball 18 within the socket 44.

To further facilitate the initial seating of the ball 18 within the socket 44, the leading edges of the bottom plate 44 and the ball guide fork 54 may be upturned, as best shown in FIG. 3, which depicts an upturned edge 56 on the bottom plate 20 and an upturned edge 58 on the ball guide fork 54. The upturned edges 56 and 58 facilitate the vertical alignment of the coupling device 10 with the ball 18 by serving as a ramp for the ball 18 to be guided down if the coupling device 10 is positioned too low with respect to the ball 18 during an attempt to seat the ball 18 within the socket 44.

Referring to FIG. 2, the top plate 22 also includes an additional hole 42, which will be referred to as the security hole. The security hole 42 provides a place for a padlock, or other similar locking device, to be secured when the spring pin 36 is in the locked position, i.e., when the bottom plate 22 is pivoted so that the holes 24 and 26 are out of alignment and the ball 18 is locked within the socket 44. When a padlock is placed through the security hole 42, the bottom plate 20 may not be pivoted to the open position because the shank of the padlock blocks the bottom plate from being pivoted by contacting the edge 56 (shown in FIG. 2) of the bottom plate 20.

It should be noted that in the preferred embodiment just described, there is only a single security hole, and that hole is found in the top plate 22. However, it is also contemplated that two security holes may be utilized, with one hole in the bottom plate 20 and the second hole in the top plate 22. In the dual security hole embodiment, the two holes are arranged so that the shank of the padlock can be fed through both security holes when the bottom plate 20 is in the locked position, thus preventing any relative movement between the bottom plate 20 and the top plate 22.

The preferred embodiment of the inner assembly 14 will now be described in connection with FIG. 3. In the preferred embodiment, a first shaft 59 is provided, which is a hollow shaft of a generally square cross-section (as best shown in FIGS. 2 and 7). While other configurations are contemplated, the first shaft 59 preferably has a two inch by two inch outer cross-section, with a ¼ inch wall thickness. Positioned within the first shaft 59 are three cushion members 66, 68, and 70, which provide dampening for axial shocks directed both upwardly and downwardly. However, it is contemplated that greater or fewer cushion members may also be utilized if desired. It is also contemplated that the three cushion members, and their associated components, may be omitted if axial dampening is not desired.

The first cushion member 66 is seated between a first spacer 72 and a second spacer 74. The first spacer 72 is welded or otherwise rigidly affixed to the top of the first shaft 59. The second spacer 74 is retained in place by an upper pin 84, which is securely maintained within the upper slot 60 by a keeper 86. Because the upper pin 84 is seated within an elongated slot, instead of being seated within a circular hole, the upper pin 84 and the second spacer 74 have limited freedom of movement in the axial direction. This limited freedom of movement allows the first cushion member 66 to absorb some of the axially directed shocks.

The second cushion member 68 is seated slightly below the first cushion member 66, with a small vacant space therebetween. The second cushion member 68 is retained in position by a third spacer 76 and a fourth spacer 78. The third spacer 76 is secured in position from above by an intermediate pin 88, which is retained in the intermediate hole 64 by a keeper 90. Positioned directly below the second cushion member 68 is a fourth spacer 78, which is used to separate the second cushion member 68 from the third cushion member 70.

The third cushion member 70 is seated upon an upper surface 82 of a solid square bar 80. The first shaft 59 is positioned over the solid square bar 80, and retained thereon by a lower pin 92, which is retained within both the lower slot 62 of the first shaft 59 and within a circular hole 94 (shown in FIG. 2) in the solid square bar 80 by a pin keeper 96 (shown in FIG. 3). If a 2 inch by 2 inch outer cross-section first shaft 59 is utilized, suitable outer cross-sectional dimensions for the solid square bar 80 are approximately 1 ½ inch by 1 ½ inch. However, one of ordinary skill in the art would be able to determine alternate suitable dimensions for these and the other components.

As best shown in FIGS. 2 and 7, the elongated lower slot 62 permits the first shaft 59 to move in a limited manner in the axial direction with respect to the solid square bar 80. The lower portion of the solid square bar 80 is welded, or otherwise rigidly affixed, to the top portion of the solid shaft 50, thus connecting the inner assembly 14 just described with the securing assembly 12 previously described. Within the first shaft 59, the disclosed configuration of the three cushion members 66, 68, and 70 serves to dampen axial forces transferred between the solid square bar 80 and the first shaft 59.

The three cushion members 66, 68, and 70 are preferably preloaded within the hollow first shaft 59 so that they are at least partially deformed. If the cushion members are not preloaded, the weight of the trailer will create the initial load on these members. Although lack of preloading should not create a dangerous situation, preloading can minimize or even eliminate any oscillations that may occur while the installed coupling device reaches a state of equilibrium. It is suggested that the first cushion member 66 be preloaded with a force of approximately 200–300 pounds of compression, and that the second cushion member 68 and the third cushion member 70 be preloaded with a higher force in the range of approximately 1000 pounds of compression. These preload forces will serve to keep the upper pin 84 seated in the lowermost portion of the upper slot 60 and will also keep the lower pin 92 seated in the lowermost portion of the lower slot 62. With the cushion members preloaded in this manner, the appropriate levels of axial dampening in both the upward and downward directions can be obtained.

In the preferred embodiment, the cushion members 66, 68, and 70 are preferably made of a material that is deformable, but not compressible. A natural rubber or other similar elastomeric material should be adequate. However, it has been found that polyurethane, and more particularly polyurethane with a hardness within the range of about sixty eight (68) to about one hundred (100) durometer, and preferably of approximately eighty eight (88) durometer, is the material of choice for the cushion members 66, 68, and 70. This material has been found to have a very beneficial combination of necessary characteristics. Polyurethane of approximately eighty eight (88) durometer hardness has been found to deform at a slower rate than natural rubber. This relatively slow deformation rate provides superior dampening when compared to natural rubber.

The three cushion members 66, 68, and 70 are each preferably generally cylindrically shaped. It is also preferred that one end of each of the cushion members includes a hemispherical portion, as best shown at 98, 100, and 102 in FIGS. 3 and 7. Generally cylindrical shaped cushion members with hemispherical ends are preferred because this shape allows the cushion members to be deformed under pressure in such a manner that they can take on the shapes of the cavities that they are seated within, which permits the optimal dampening effect. This preferred shape, which resembles a bullet, also results in a cushion member that requires increasing amounts of force to result in the deformation thereof.

However, while bullet-shaped cushions are preferred, it is contemplated that the cushion members may be made in other shapes, such as simple cylindrical shapes with no hemispherical portion, and that these alternate shapes may also be successfully utilized with the instant invention. Although, it should be noted that if the preferred material is used for the three cushion members, i.e., if a deformable, noncompressible material is used, the cushion members need to be shaped with some form of recess, cavity, or air space to accommodate the surplus material once the deformation takes place. Otherwise, if a noncompressible material of the exact shape of the cavity is used, proper deformation, and thus proper dampening, will not take place. In the preferred embodiment with the hemispherical end portion, an air space into which the excess material may be deformed into is found around the outside of the hemispherical portion.

In practice, it has been found that the first cushion member 66 need not be as long as either the second cushion member 68 or the third cushion member 70. This is the case because the first cushion member 66 primarily dampens the relatively small forces created by the trailer pulling up and pushing down on the coupling device 10, while the second and third cushion members 68 and 70 primarily dampen the relatively large forces created by the truck pulling up and pushing down on the coupling device 10. One preferred size for the first cushion member 66 is 1 ½ inches in length by 1 ½ inch diameter. One preferred size for the second and third cushion members 68 and 70 is 2 ½ inches in length by 1 ½ inch diameter. However, it should be understood that alternate sizes for all three cushion members are also contemplated as being within the scope of the invention, including arrangements where all three cushions are the same size and where all three cushions are of different sizes.

As shown in FIGS. 3 and 7, in the preferred embodiment the third spacer 76 may have a thickness that is greater than the other spacers (i.e., the first spacer 72, the second spacer 74, and the fourth spacer 78). The third spacer 76 may be made thicker than the other spacers because this spacer must be able to withstand larger forces than the other spacers, and is therefore more likely to be deformed. To prevent this possible deformation, the third spacer 76 has been made with a thickness of approximately ½ inch, while the other three spacers each have a thickness of approximately ¼ inch. As stated earlier with respect to other dimensions that have been recited, these suggested dimensions for the spacers have been provided by way of example only, and those of ordinary skill in the art should be able to devise alternate suitable dimensions, if necessary.

In accordance with one aspect of the present invention, the preferred embodiment of the outer assembly 16 will now be described. The bulk of the length of the outer assembly 16 can be found in the main tube 104. Positioned within the top of the main tube 104 is an upper tube 106. The upper tube 106 should be rigidly affixed to main tube 104 by welding or other similar affixing method. It is suggested that the main tube 104 and the upper tube 106 be welded together at the tops thereof, with an edge joint, so that the upper peripheral surface of the main tube 104 is connected with the upper peripheral surface of the upper tube 106. In this manner, if the main tube 104 needs to be disconnected from the upper tube 106, the edge weld may be simply ground off with the use of suitable machinery, and the two components can then be separated.

Figure 5:
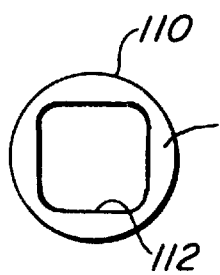
FIG. 5 is an enlarged top view of the connecting member.

A connecting member 108 is rigidly affixed (by welding or other similar method) to the inner portion of the bottom of the upper tube 106. As best seen in FIG. 5, the connecting member 108 includes a circular outer periphery 110 and a square inner periphery 112. The circular outer periphery 110 should be of a diameter slightly less than the inner diameter of the upper tube 106, creating a gap small enough to be easily filled by the weld filler material when the connecting member 108 is welded to the upper tube 106. The square inner periphery 112 should be slightly larger than the outer periphery of the square, hollow first shaft 59 so that there is a gap of approximately ⅛ of an inch created between the connecting member 106 and the first shaft 58. This gap permits the connecting member 108 to pivot slightly about the first shaft 59, with the upper pin 84 and the intermediate pin 88 creating a pivot point therebetween. When the upper pin 84 is pushed to the top of the upper slot 60, the connecting member 108 is also permitted limited axial movement between the upper pin 84 and the intermediate pin 88.

A lower tube 114 is connected to the bottom portion of the main tube 104. The lower tube 114 is preferably welded to the main tube with a lap joint created at the top portion of the lower tube 114. However, other means of rigidly affixing the lower tube 114 with the main tube 104 are also contemplated. Another lap joint, or similar affixing means, is also used to rigidly secure a bell-shaped section 116 to the lower tube 114. It is also contemplated that the bell-shaped section 116 may also be welded directly to the main tube 104, or that a unitary structure including both a main tube type section and a bell-shaped section may also be used, if appropriately sized components are available.

In accordance with an important aspect of the present invention, an annular cushion 120 is provided for absorbing shocks in the longitudinal direction and is held in place by a retaining ring 118, which is rigidly affixed within the bell-shaped section 116. The retaining ring 118 includes several tabs 122 extending downwardly therefrom. In the preferred embodiment, the lowermost portions of the tabs 120 are welded via edge joints to the lowermost portion of the bell-shaped section 116. In this manner, if the annular cushion 120 needs to be replaced, the edge welds between the tabs 122 and the bottom of the bellshaped section 116 can simply be ground off, and the annular cushion 120 can be removed from within the bell-shaped section 116 without requiring disassembly of the entire device.

The following dimensions are preferred for the primary components of the outer assembly 16. The main tube 104 may have an outer diameter of approximately 3 ½ inches; the upper tube 106 may have an outer diameter of approximately 3 inches; the lower tube 114 an outer diameter of approximately 4 inches; and the bell-shaped section outer diameters of approximately 4 inches at the top and 5 inches at the bottom. Alternate dimensions should be apparent to those of ordinary skill in the art. However, when selecting alternate dimensions, it should be kept in mind that the largest outer diameter of a component of the inner assembly 14 should be smaller than the smallest inner diameter of the outer assembly 16 so that the outer assembly 16 can be coaxially mounted over the inner assembly 14.

While in the preferred embodiment, the first shaft 59, the second shaft 80, and the inner periphery 112 of the connecting member 108 are all shown and described as being of square cross-sections, other cross-sectional configurations are also contemplated as being within the scope of the invention. However, if alternate cross-sections are desired, it is important that these alternate cross-sections include an effective means of preventing relative rotation between the two primary components—the outer assembly 16 and the inner assembly 14. If such a rotation prevention means is not provided, the inner assembly 14 and the outer assembly 16 will be permitted to rotate with respect to each other, which will provide unnecessary wear to both the connecting member 108 and the annular cushion 120.

Figure 6:
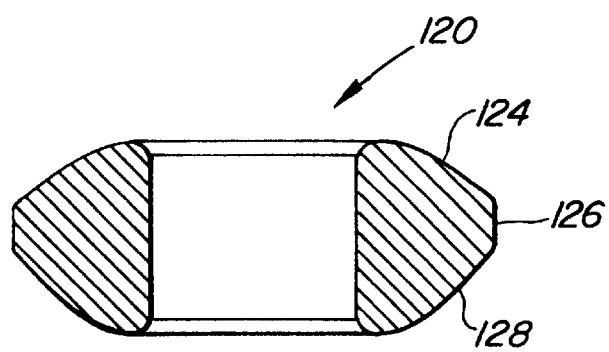
FIG. 6 is an enlarged cross-sectional view of the annular cushion.

One important feature of the present invention is the shape of the annular cushion 120. Referring now to FIG. 6, a cross-sectional view of the annular cushion 120 is shown. The upper periphery 124 of the annular cushion 120 is preferably sloped downwardly and radially outwardly. The upper periphery 124 is integrally connected to an annular truncated portion 126. Below the annular truncated portion 126, there is a lower periphery 128, which is sloped downwardly and radially inwardly. Preferably, the upper periphery 124 is of a lesser slope relative to horizontal than the lower periphery 128, which makes the axial height of the upper periphery 124 less than the axial height of the lower periphery 128.

In practice, it has been shown that this configuration of the annular cushion 120 provides an ample degree of lateral dampening. However, it is also contemplated that annular cushions of shapes other than that shown and described will also provide adequate lateral dampening. Examples of other shapes for the annular cushion 120 that should provide sufficient dampening include: a shape similar to that shown in FIG. 6, except with the upper and lower peripheries being symmetric about a horizontal plane; a shape similar to the FIG. 6 shape, either with or without symmetric upper and lower peripheries, but without the truncated portion; a simple symmetrical toroid; an asymmetrical toroid; and a symmetrical or asymmetrical toroid with a truncated portion. It is also contemplated that the annular cushion 120 could include an axial split therein to facilitate installation and removal of the annular cushion 120 onto the inner assembly 14. It is further contemplated that the annular cushion 120 need not even be a single annular member, but could instead include several separate members that could be positioned within the bell-shaped section 116 of the outer assembly 16 around the inner circumference thereof.

The annular cushion 120 provides shock dampening primarily for forces created in the lateral direction. These forces are most commonly created in significant magnitudes when the truck and the trailer connected together by the instant coupling device 10 make a turn, or when there is a change in velocity, such as when the towed and towing vehicles are slowing down to a stop or accelerating from a stopped position. The highest magnitude lateral forces are probably created during a change in velocity (compared to the lower magnitude forces created during turning). Thus, it may be beneficial to include two radially thickened or more resilient portions at the front and back of the annular cushion 120 to accommodate these high magnitude lateral forces. It is thus contemplated that the annular cushion 120 could be fabricated from several different materials, where a more resilient material is used at the front and back portions thereof, and/or that the annular cushion could include radially thickened portions at the front and back thereof.

In operation, the assembled coupling device 10 (as shown in FIG. 1) is rigidly connected to a trailer (not shown) in an upright position, i.e., with the main tube 104 extending vertically. This connection between the coupling device 10 and the trailer is accomplished by welding (or otherwise rigidly affixing) the upper portion of the main tube 104 to a horizontally extending surface on the front portion of a trailer. When the trailer is desired to be coupled to a truck or other towing vehicle (not shown), the truck is moved into close proximity of the trailer such that the hole 24 in the bottom of the securing assembly 12 is substantially aligned with the ball 18 (see FIG. 3) that is rigidly affixed to a location near the rear portion of the truck. The coupling device 10 and the truck are then manipulated until the ball 18 is seated within the socket 44 of the coupling device 10.

Once the ball 18 is seated in the socket 44, the spring pin 36 is pulled out of center hole 38, and the bottom plate 20 is pivoted about pivot pin 28 until the spring pin 36 is seated in the offset hole 40. At this point, the ball 18 is securely held within the socket 44 because one side of the hole 24 in the bottom plate 20 is contacting, or very nearly contacting, the reduced diameter portion 52 of the ball 18. Therefore, the combination of the two holes 24 and 26 effectively provides a reduced diameter hole of a diameter too small to permit the large diameter portion of the ball 18 to pass through. Accordingly, the ball 18 cannot accidentally become unseated from within the socket 44. Also at this point, the operator may wish to prevent unauthorized removal of the trailer from the truck by placing a padlock through the security hole 42. With the padlock in place, the shank of the padlock prevents the bottom plate 20 from being pivoted to the open position.

With the coupling device 10 in place to connect the trailer to the truck, the truck may begin to tow the trailer. During this towing operation, the assorted lateral forces will be dampened by the annular cushion 120 and the assorted axial forces will be dampened by a second cushioning assembly that includes the three cushion members 66, 68, and 70. Because both the axial and lateral forces will be dampened, their ability to reduce the life of the coupling device should be minimized. Accordingly, the present coupling device 10 should provide a long useful life for its operator, without the need for substantial repairs or replacement.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A coupling device for attaching a towed vehicle to a towing vehicle, said coupling device comprising:
   a securing assembly for removably securing said coupling device to the towing vehicle;
   a generally longitudinally extending inner assembly rigidly affixed to said securing assembly;
   a generally longitudinally extending outer assembly, said outer assembly having an upper portion and a lower portion, with said upper portion being adapted to be rigidly affixed to the towed vehicle, said outer assembly further having an inner diameter larger than an outer diameter of said inner assembly such that said outer assembly can be coaxially mounted over said inner assembly;
   a connecting member for connecting said inner assembly with said outer assembly; and
   first cushioning means positioned between said outer assembly and said inner assembly, said cushioning means being configured and arranged to primarily dampen lateral forces transferred between said inner assembly and said outer assembly, said first cushioning means including an annular truncated portion around an outer periphery thereof.

2. The coupling device as defined in claim 1 further comprising secondary cushioning means located within a hollow section of said inner assembly.

3. The coupling device as defined in claim 2 wherein said secondary cushioning means includes a plurality of cushion members separated by a plurality of spacing members.

4. The coupling device as defined in claim 3 wherein said cushion members of said secondary cushioning means are fabricated from a polyurethane material.

5. The coupling device as defined in claim 2 wherein said secondary cushioning means includes:
   a first spacing member rigidly mounted adjacent an upper portion of said inner assembly;
   a first cushion member positioned below said first spacing member;
   a second spacing member positioned below said first cushion member;
   a third spacing member positioned below said second spacing member;
   a first pin and a second pin positioned between said second spacing member and said third spacing member, said first and second pins extending through said inner assembly to limit axial movement of both said second spacing member and said third spacing member;
   a second cushion member positioned below said third spacing member;
   a fourth spacing member positioned below said second cushion member; and
   a third cushion member positioned below said fourth spacing member.

6. A coupling device as defined in claim 5 further wherein said connecting member is positioned between said first pin and said second pin such that said first pin and said second pin each limit axial movement of said connecting member in a different direction.

7. A coupling device as defined in claim 5 further wherein:
   said first cushion member is generally bullet-shaped with a hemispherical portion contacting said first spacing member;
   said second cushion member is generally bullet-shaped with a hemispherical portion contacting said third spacing member; and
   said third cushion member is generally bullet-shaped with a hemispherical portion facing away from said fourth spacing member.

8. The coupling device as defined in claim 1 wherein said connecting member is rigidly mounted to said outer assembly and slidably mounted to said inner assembly such that said inner assembly and said outer assembly are permitted limited movement with respect to each other.

9. The coupling device as defined in claim 1 wherein said first cushioning means is fabricated from a polyurethane material.

10. The coupling device of claim 1 wherein said outer assembly includes:
    a main tube;
    an upper tube rigidly affixed within said main tube at an upper portion thereof;
    a lower tube rigidly affixed to an outer periphery of said main tube at a lower portion thereof;
    a generally bell-shaped section rigidly affixed to said lower tube; and
    a retaining member for retaining said cushioning member in position between said outer assembly and said inner assembly, said retaining member being rigidly affixed to said bell-shaped section.

11. The coupling device as defined in claim 1 further comprising:
    a generally bell-shaped section located at said lower portion of said outer assembly; and
    a retaining member rigidly affixed within said bell-shaped section, whereby said retaining member retains said cushioning means within said bell-shaped section of said outer assembly.

12. The coupling device as defined in claim 1 wherein said inner assembly includes:
    a first shaft, said first shaft being hollow and including an upper slot, a lower slot, and an intermediate hole located between said upper slot and said lower slot, further wherein said upper slot, said lower slot and said intermediate hole all extend completely through said first shaft;
    a first pin positioned in said upper slot;
    a second pin positioned in said intermediate hole, said first pin and said second pin being positioned around said connecting member such that said first pin and said second pin each limit axial movement of said connecting member in a different direction;
    a third pin positioned in said lower slot;
    a second shaft positioned partially within said first shaft, said first shaft and said second shaft being connected via said third pin and said lower slot such that said first shaft is configured and arranged for limited axial movement with respect to said second shaft.

13. A coupling device for attaching a towed vehicle to a towing vehicle, said coupling device comprising:
    a securing assembly for removably securing said coupling device to the towing vehicle;
    a generally longitudinally extending inner assembly rigidly affixed to said securing assembly;
    a generally longitudinally extending outer assembly, said outer assembly having an upper portion and a lower portion, with said upper portion being adapted to be rigidly affixed to the towed vehicle, said outer assembly further having an inner diameter larger than an outer diameter of said inner assembly such that said outer assembly can be coaxially mounted over said inner assembly;

a connecting member for connecting said inner assembly with said outer assembly;

cushioning means positioned between said outer assembly and said inner assembly, said cushioning means being configured and arranged to primarily dampen lateral forces transferred between said inner assembly and said outer assembly;

said inner assembly includes a hollow first shaft, said first shaft having a generally rectangular-shaped outer periphery; and said connecting member is an annular member with a generally circular-shaped outer periphery and a generally rectangular-shaped inner periphery, said generally rectangular-shaped inner periphery of said connecting member substantially corresponding to said generally rectangular-shaped outer periphery of said first shaft whereby said connecting member is rigidly mounted to said outer assembly and slidably mounted to said inner assembly via a plurality of pins extending through a plurality of corresponding openings in said first shaft, whereby said inner assembly and said outer assembly are permitted limited movement with respect to each other.

14. A coupling device for attaching a towed vehicle to a towing vehicle, said coupling device comprising:

a securing assembly for removably securing said coupling device to the towing vehicle, wherein said securing assembly includes a socket, said socket being defined, at least in part, by a solid shaft located towards a lower portion of said inner assembly and further wherein said solid shaft includes a concave portion for receiving a ball positioned on towing vehicle;

a generally longitudinally extending inner assembly rigidly affixed to said securing assembly;

a generally longitudinally extending outer assembly, said outer assembly having an upper portion and a lower portion, with said upper portion being adapted to be rigidly affixed to the towed vehicle, said outer assembly further having an inner diameter larger than an outer diameter of said inner assembly such that said outer assembly can be coaxially mounted over said inner assembly;

a connecting member for connecting said inner assembly with said outer assembly; and cushioning means positioned between said outer assembly and said inner assembly, said cushioning means being configured and arranged to primarily dampen lateral forces transferred between said inner assembly and said outer assembly.

15. A coupling device for attaching a towed vehicle to a towing vehicle, said coupling device comprising:

a securing assembly for removably securing said coupling device to the towing vehicle;

a generally longitudinally extending inner assembly rigidly affixed to said securing assembly;

a generally longitudinally extending outer assembly, said outer assembly having an upper portion and a lower portion, with said upper portion being adapted to be rigidly affixed to the towed vehicle, said outer assembly further having an inner diameter larger than an outer diameter of said inner assembly such that said outer assembly can be coaxially mounted over said inner assembly;

a connecting member for connecting said inner assembly with said outer assembly; and cushioning means positioned between said outer assembly and said inner assembly, said cushioning means being configured and arranged to primarily dampen lateral forces transferred between said inner assembly and said outer assembly;

wherein said securing assembly includes:

a socket, said socket being defined between a solid shaft located towards a lower portion of said inner assembly and a generally cylindrical tube rigidly affixed to an outer periphery of said solid shaft;

a first plate rigidly affixed to a lower portion of said cylindrical tube, said first plate including a hole therein for receiving a ball located on the towing vehicle;

a second plate pivotally attached to said first plate, said second plate including a hole therein for receiving the ball located on the towing vehicle; and a spring pin for locking said first plate and said second plate in one of at least two different positions, an open position in which the ball may be entered into or withdrawn from the socket and a locked position in which the ball is retained within said socket.

16. The coupling device as defined in claim 15 wherein said first plate includes a security hole therein such that when said second plate is pivoted into the locked position, a padlock may be inserted through said security hole to inhibit further pivoting of said second plate with respect to said first plate.

17. A coupling device for attaching a towed vehicle to a towing vehicle, said coupling device comprising:

a securing assembly for removably securing said coupling device to the towing vehicle;

a lower assembly, said lower assembly being fixed to said securing assembly;

an upper assembly, said upper assembly being adapted to be fixed to the towed vehicle;

a connecting member for connecting said lower assembly with said upper assembly;

cushioning means operatively associated with said lower assembly and said upper assembly, said cushioning means being configured and arranged to primarily dampen axial forces transferred between said lower assembly and said upper assembly, and wherein said cushioning means includes at least one cushion member preloaded under compression in an axial direction, wherein said cushioning means includes:

at least one upper cushion member configured and arranged to primarily dampen both upwardly directed and downwardly directed axial forces transferred from the towed vehicle to the coupling device;

a plurality of lower cushion members configured and arranged to primarily dampen both upwardly directed and downwardly directed axial forces transferred from the towing vehicle to the coupling device; and a plurality of spacer member for separating said plurality of lower cushion members from each other and from said at least one upper cushion member.

18. The coupling device as defined in claim 17 wherein said cushioning means includes:

at least one upper cushion member configured and arranged to primarily dampen both upwardly directed and downwardly directed axial forces transferred from the towed vehicle to the coupling device; and at least one lower cushion member configured and arranged to primarily dampen both upwardly directed and downwardly directed axial forces transferred from the towing vehicle to the coupling device.

19. The coupling device as defined in claim 18 wherein said at least one lower cushion member is preloaded with a greater force than said at least one upper cushion member.

20. A gooseneck coupler for use in attaching a trailer to a towing vehicle, said gooseneck coupler comprising:

a socket assembly for removably securing said coupler to a corresponding ball located on the towing vehicle, said socket assembly including a socket which is defined, at least in part, by a solid shaft located towards a lower portion of said inner assembly and further wherein said solid shaft includes a concave portion for receiving a ball positioned on towing vehicle;

a generally longitudinally extending inner assembly affixed to said socket assembly;

a generally longitudinally extending outer assembly, said outer assembly having an upper portion and a lower portion, with said upper portion being adapted to be rigidly affixed to the trailer, said outer assembly further having an inner diameter larger than an outer diameter of said inner assembly such that said outer assembly can be coaxially mounted over said inner assembly;

a connecting member for connecting said outer assembly and said inner assembly and for allowing limited movement between said outer assembly and said inner assembly;

a first cushioning arrangement positioned between said lower portion of said outer assembly and said inner assembly, said first cushioning arrangement being configured and arranged to primarily dampen transverse forces transferred between said inner assembly and said outer assembly; and a second cushioning arrangement positioned within said inner assembly, said second cushioning arrangement being configured and arranged to primarily dampen axial forces transferred between said inner assembly and said outer assembly.

21. The gooseneck coupler defined in claim 20 wherein said first cushioning arrangement includes an annular cushion.

22. The gooseneck coupler defined in claim 20 wherein said second cushioning arrangement includes a plurality of cushion members located within a hollow portion of said inner assembly, said plurality of cushion members being separated by a plurality of spacer members.

23. A coupling device for attaching a towed vehicle to a towing vehicle, said coupling device comprising:

a securing assembly for removably securing said coupling device to the towing vehicle;

a lower assembly, said lower assembly being fixed to said securing assembly;

an upper assembly, said upper assembly being adapted to be fixed to the towed vehicle;

a connecting member for connecting said lower assembly with said upper assembly;

first cushioning means positioned between said lower assembly and said upper assembly, said first cushioning means being configured and arranged to primarily dampen lateral forces transferred between said lower assembly and said upper assembly, said first cushioning means including an annular truncated portion around an outer periphery thereof; and second cushioning means operatively associated with said lower assembly and said upper assembly, said second cushioning means being configured and arranged to primarily dampen axial forces transferred between said lower assembly and said upper assembly.

24. The coupling device as defined in claim 23 wherein:

said upper assembly includes a generally longitudinally extending hollow structure; and said lower assembly includes a generally longitudinally extending arrangement configured to be seated within said upper assembly.

25. The coupling device of claim 24 wherein said upper assembly further includes:

a main tube;

a generally bell-shaped section rigidly affixed to said main tube; and a retaining member for retaining said first cushioning means in position between said lower assembly and said upper assembly.

26. The coupling device as defined in claim 23 wherein said first cushioning means includes an annular cushion.

27. The coupling device as defined in claim 23 wherein said second cushioning means includes a plurality of cushion members separated by a plurality of spacing members.

* * * * *